United States Patent [19]

Stentiford

[11] Patent Number: 4,955,056
[45] Date of Patent: Sep. 4, 1990

[54] PATTERN RECOGNITION SYSTEM

[75] Inventor: Frederick W. M. Stentiford, Woodbridge, England

[73] Assignee: British Telecommunications public company limited, London, England

[21] Appl. No.: 886,072

[22] Filed: Jul. 16, 1986

[30] Foreign Application Priority Data

Jul. 16, 1985 [GB] United Kingdom ............... 8517918

[51] Int. Cl.$^5$ ............................................. G10L 5/06
[52] U.S. Cl. ..................................................... 381/43
[58] Field of Search .................................. 381/41–45; 364/513.5; 382/10–11, 16, 18, 19, 30

[56] References Cited

U.S. PATENT DOCUMENTS

| 3,303,466 | 2/1967 | Holt et al. | 340/146.3 |
|---|---|---|---|
| 3,498,191 | 3/1970 | Dickinson | 95/1 |
| 3,519,990 | 7/1970 | Holt et al. | 340/146.3 |
| 3,541,259 | 11/1970 | Gilmor | 179/1 |
| 3,603,930 | 9/1971 | Britt et al. | 340/146.3 J |
| 3,603,931 | 9/1971 | Britt et al. | 340/146.3 J |
| 3,717,848 | 2/1973 | Irvin et al. | 340/146.3 Q |
| 3,810,093 | 5/1974 | Yasunda et al. | 340/146.3 MA |
| 3,878,509 | 4/1975 | Kikuchi et al. | 340/146.3 H |
| 3,940,565 | 2/1976 | Lindenberg | 381/43 |
| 4,027,284 | 5/1977 | Hoshino et al. | 340/146.3 |
| 4,110,737 | 8/1978 | Fahey | 340/146.3 Q |
| 4,119,946 | 10/1978 | Taylor et al. | 340/146.3 Q |
| 4,153,897 | 5/1979 | Yasuda et al. | 340/146.3 Q |
| 4,349,700 | 9/1982 | Pirz et al. | 381/43 |
| 4,379,283 | 4/1983 | Ito et al. | 382/18 |
| 4,400,828 | 8/1983 | Pirz et al. | 382/30 |
| 4,596,038 | 6/1986 | Yoshida | 382/11 |
| 4,707,857 | 11/1987 | Marley et al. | 381/44 |
| 4,723,290 | 2/1988 | Watanabe et al. | 381/43 |
| 4,817,171 | 3/1989 | Stentiford | 382/19 |

FOREIGN PATENT DOCUMENTS

| 1173161 | 8/1984 | Canada . |
|---|---|---|
| 0043006 | 1/1982 | European Pat. Off. . |
| 0086589 | 8/1983 | European Pat. Off. . |
| 0116324 | 8/1984 | European Pat. Off. . |
| 0125648 | 11/1984 | European Pat. Off. . |
| 84/03983 | 10/1984 | PCT Int'l Appl. . |
| 963554 | 7/1964 | United Kingdom . |

OTHER PUBLICATIONS

Development of a Kanji OCR: An Optical Chinese Character Reader-Proc. 4th International Joint Conference on Pattern Recognition, Nov. 7-10, pp. 816-820-H. Fujisawa et al.

Schalk et al., "Low Cost Work Recognition Using Programmable VLSI," Proceedings of the IEEE National Aerospace and Electronics Conference, 18-20 May 1982, vol. 3, pp. 1095-1101.

"Speech Recognition by Machine: A Review"-Proc. IEEE, vol. 64, No. 4, Apr. 1970-D. Faj Reddy, pp. 501-530.

(List continued on next page.)

Primary Examiner—Gary V. Harkcom
Assistant Examiner—John A. Merecki
Attorney, Agent, or Firm—Nixon & Vanderhye

[57] ABSTRACT

A waveform recognition system including a plurality of detectors of features having the combined presence at a plurality of instants spaced at predetermined intervals relative to each other in time of instantaneous amplitudes each satisfying respectively predetermined constraints; apparatus for assigning a plurality of labels and corresponding confidence measures to each of successive portions of the waveform in dependence on the features detected in the portions and storing each label in a buffer corresponding to the rank of the confidence with which the label is assigned relative to other labels assigned to the same portion of data and apparatus for outputting labels from that buffer containing labels assigned with the highest confidence whose confidence measures are in a predetermined relationship with those of adjacent labels in the same buffer when the confidence measures of labels in other buffers containing labels assigned with confidence measures of lower rank satisfy predetermined conditions.

16 Claims, 8 Drawing Sheets

OTHER PUBLICATIONS

"Cost-Effective Speech Processing"–Dragon Systems Inc.–Baker et al., IEEE, 1984, pp. 9.7.1–9.7.4.

"Two Level D-P Matching–Dynamic Programming-Based Pattern Matching Algorithm for Connected Work Recognition"–Sakoe, IEEE Trans. ASSP, vol. ASSP-27, No. 6, 1979, pp. 588–595.

"A New Time Domain Analysis of Human Speech and Other Complex Waveforms", a Ph.D. Thesis of Janent MacIver Baker, 3 p. extract of text plus FIG. 3, 1975.

Leimer, "Design Factors in the Development of an Optical Character Recognition Machine", IRE Transactions on Information Theory; vol. IT-8, No. 2, Feb. 1962, pp. 167–171.

IEE Conference on Patent Recognition 1986–"A Practical Technique for Feature Detection"–R. H. Britt, pp. 347–354.

IBM Journal of Research and Development–Sep. 1968, "The IBM 1975 Optical Page Reader", Parts #I, II and III, Hennis, 1975, pp. 346–370.

IBM Journal, Jan. 1963–"Computer Automated Design of Multi-Font Print Recognition Logic"–Kamentsky and Liu, pp. 2–13.

Optical Character Recognition (Spartan Books 1962), "Some Important Factors in the Practical Utilization of OCR Readers"–Greanias, pp. 129–146.

"A New Concept in the Design of Finite Automata", Stentiford, Ph.D. Thesis, pp. 1–145.

International Electronics, vol. 4, No. 54, 24th Feb. 1981, p. 82, New York, U.S., K. Smith: "Unit Identifies Words in Run-on Speech".

ICASSP '82, Proceedings of the IEEE International Conference on Accoustics, Speech and Signal Processing, vol. 1, 3rd–5th May 1982, Paris, FR, pp. 517–520, IEEE, New York, U.S., M. McMahan et al.: "Speech Processing Using Programmable VLSI".

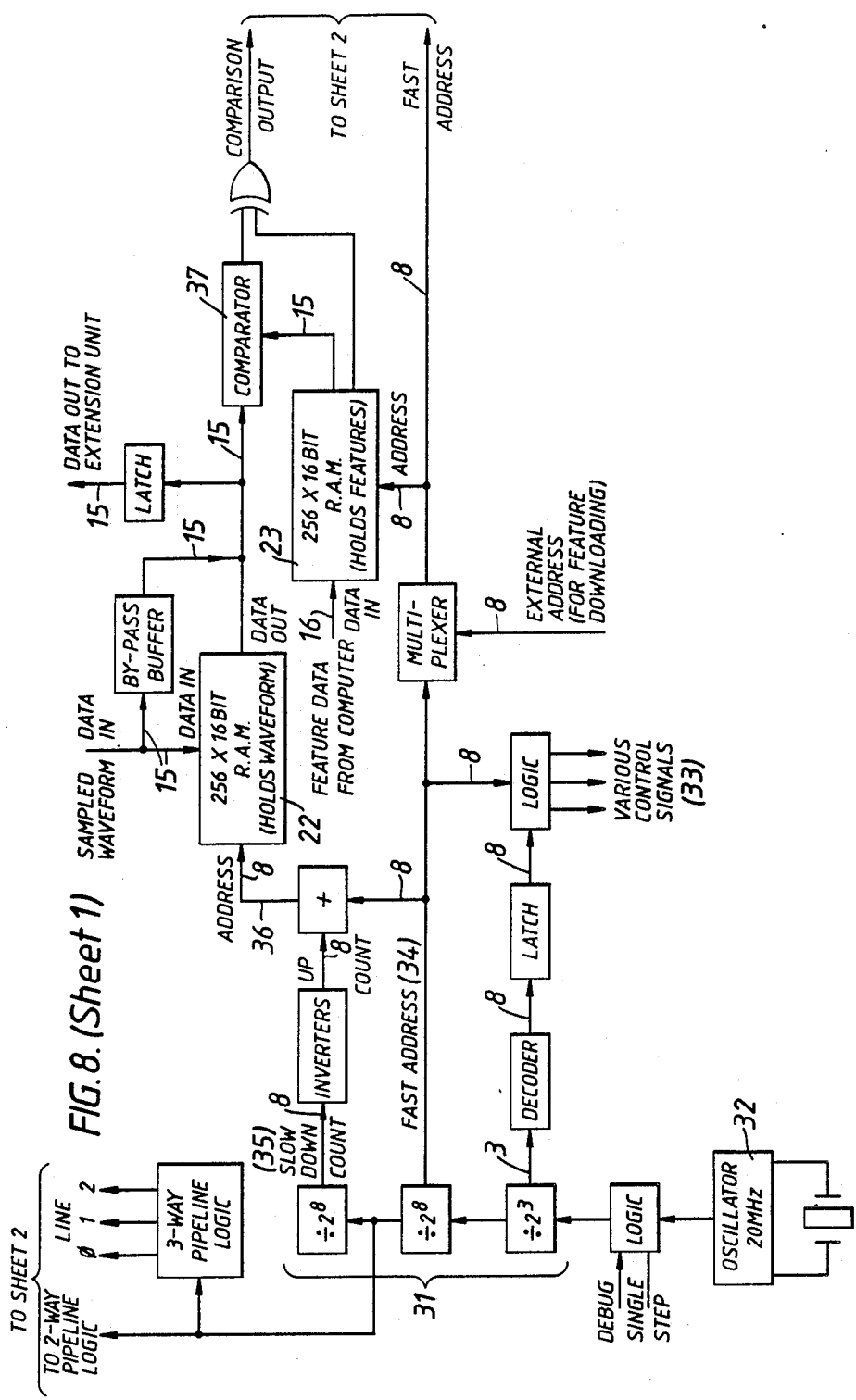

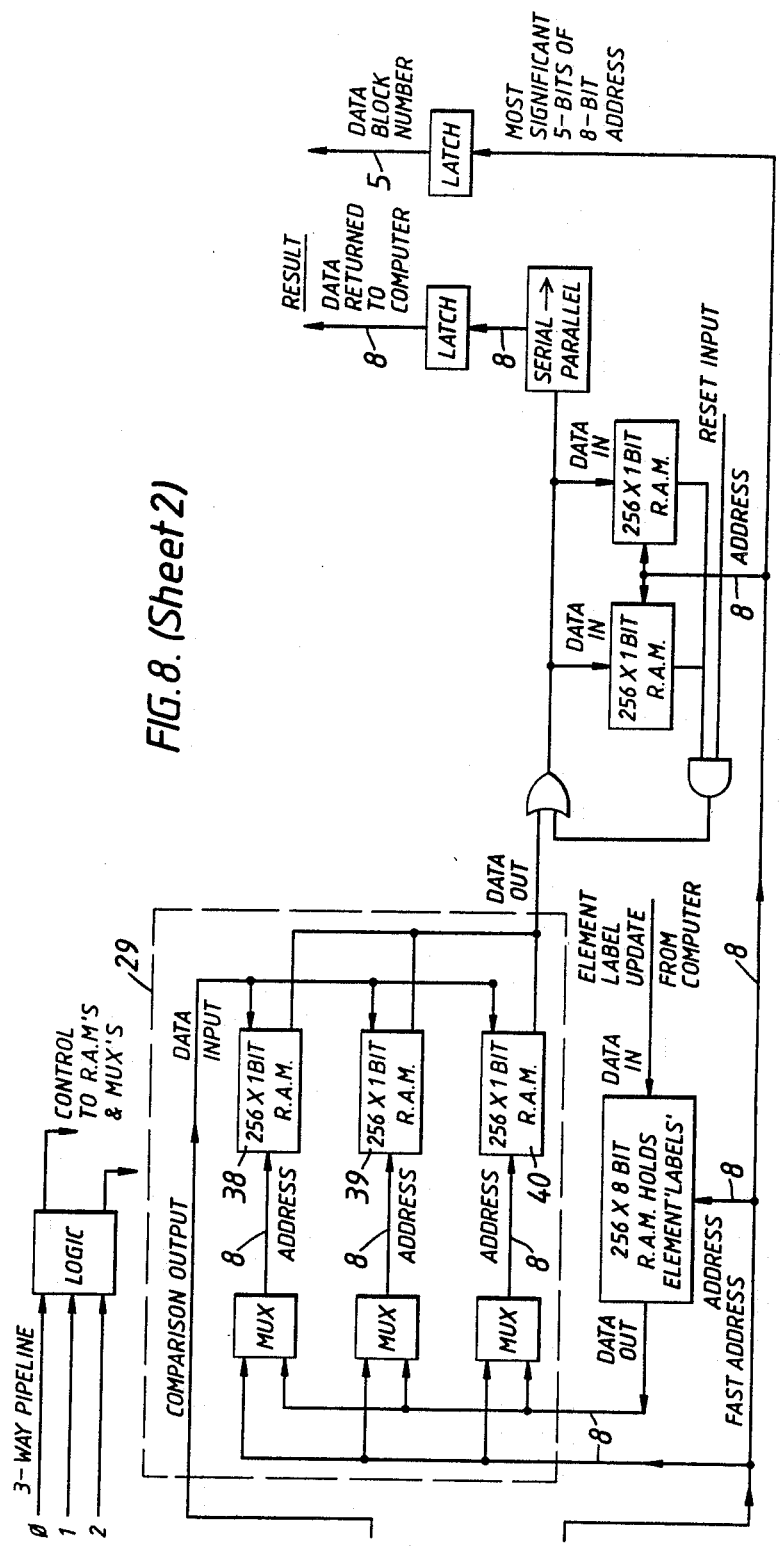
FIG. 8. (Sheet 2)

PATTERN RECOGNITION SYSTEM

CROSS REFERENCE TO RELATED APPLICATION

This application is related to my earlier filed copending U.S. patent application Ser. No. 721,402 filed Apr. 9, 1985, U.S. Pat. No. 4,817,171.

BACKGROUND OF THE INVENTION

1. Field of the Invention

This invention relates to a recognition system and in particular to systems for the recognition of waveforms. Particular applications of such systems include the recognition of speech waveforms or waveforms arising from any other physical process. Throughout this specification particular reference will be made to speech recognition systems. However, the present invention is equally applicable to other recognition problems.

2. Description of the Related Art

In conventional waveform recognition systems the waveform is first segmented into time frames, and various pre-processing steps carried out before actual recognition takes place, as is shown for example in U.S. Pat. No. 4,400,828 in which feature signals are segmented, normalized and warped to a standard duration before recognition. The aim of these stages is to reduce some of the redundancy of the waveform and to work with a less repetitive pattern.

In speech recognition the original waveform to be recognized is one of sound pressure varying with time. This variation in amplitude may be represented electronically as, for example, a voltage level varying with time. However the characteristic commonly studied in known speech recognizers is that of the variation of energy with frequency for successive short time segments of the waveform. Such a system is shown for example in European Patent Application 0086589 where the speech patterns to be recognized are a time series of frequency spectrum envelopes. Such spectrum transformation from a time domain to a frequency domain representation is used to derive spectrograms of unknown words which can then be correlated with the spectrograms of known words for recognition by choosing the reference spectrogram which is most similar to the unknown spectrogram.

Such spectrograms can be obtained for example from a set of tuned filters whose outputs are sampled periodically thus producing a spectrogram of a particular time window of speech. To compensate for the low high frequency spectral magnitudes of some distinctive features it is also common to pre-emphasize the spectral content of the waveform by amplifying the signal by a factor which increases with frequency.

The aim of such signal transformations is to improve the recognition performance of the overall system. However, although much signal redundancy is removed, information is also lost. For instance, the time ordering of events separated by periods less than the width of the transform window or the filter bank time constant are lost. The loss of such information has a detrimental effect on the recognition performance on waveforms which are only distinguishable by short transient events.

Such spectrogram correlation methods are conventionally extended by detecting the peaks in energy called formants which can be observed in spectrograms. Spoken words are characterized by the pattern of energy peaks in the frequency - time domain, but as with phonemes, there is no definition of formants which is independent of word context or speaker. Moreover formants are extremely difficult to locate reliably in real speech.

In addition to the above problems speech signals suffer from considerable variation between repetitions of the same utterance, and between utterances from different speakers of the same words. Such variations can occur in a variety of characteristics one example being the time duration of a word. This hampers conventional recognition systems which are unable to act independently of such variability.

Non-linear variations in the duration of words are conventionally handled by allowing the spectrograms being correlated to stretch in time or frequency by a process known as Dynamic Time Warping (DTW). However such methods have a large processing requirement and the consequently less specific matching process increases the likelihood of mismatches between similar sounding words e.g. pin, bin.

The preliminary segmentation of speech into words that the above systems require is generally achieved by assuming that the energy of the acoustic signal drops beneath a threshold for a sufficient period of time between words to be detectable. However with connected speech where words are run together such an assumption is incorrect. Furthermore, if a DTW technique is being used this necessitates the word category decision being made in parallel with the word segmentation decision even though this requires an even greater computational requirement.

In contrast to the above recognizers very few known waveform recognizers work directly from the speech waveform and thus in the time domain because of the seeming impracticability of matching sample waveforms directly with reference waveforms. There are some systems which use zero crossing detection as an alternative to the above frequency spectrum analysis. Zero crossings however give only a crude measure of the original waveform and much of the essential information for recognition contained in the waveform is lost.

Some investigations of the time domain signal for speech (as opposed to the more common frequency domain spectrograms) have been made as for example that disclosed in the PhD Thesis of J. M. Baker (Carnegie Mellon University 1975). However such studies have been limited to the observation of distinctive phonetic events and their characterization by five measures: cycle period, cycle frequency, cycle amplitude, and two measures of high frequency components within each cycle. This is an extension of the zero crossing method but it still does not take account of important relationships between successive cycles in the signal. It also cannot cope with any within-cycle structure other than through the maximum amplitude measure and two rough estimates of high frequency content.

SUMMARY OF THE INVENTION

According to a first aspect of the present invention there is provided an electronic waveform recognizing system comprising, means for the input of electronic data corresponding to a waveform to be recognized whose instantaneous amplitude is variable with time, a feature matching device comprising a plurality of feature detectors for detecting any occurrence in successive portions of said input waveform of any of a plurality of respective features and decision means for outputting as electronic recognition signals labels corresponding to portions of said waveform and chosen from a reference set of labels in dependence on the features detected by said feature matching device in said successive portions wherein each of said features comprises the combined presence at a plurality of instants spaced at predetermined intervals relative to each other in time of instantaneous amplitudes each satisfying respectively predetermined constraints.

Preferably the constraints to be satisfied by the instantaneous amplitudes tested by the feature detectors test are that they are each required to be greater than a respectively predetermined value or less than a respectively predetermined value. Other suitable forms of constraints may be used though, for example the amplitude may be required to lie within predetermined values or be greater than or equal to or less than or equal to predetermined values.

The use of such a feature matching device in a waveform recognizer enables account to be taken of important relationships between successive cycles in the signal and of any within-cycle structures with considerable ease. Furthermore since the system uses a feature detecting method of recognition the features used may be easily adapted to suit particular recognition problems. The system is also particularly amenable to fast operation when embodied in an integrated circuit.

Preferably the portions of the waveform to be recognized which are adjacent overlap. This enables continuous recognition to take place more easily if required without the problems of segmentation. The overlap may consist of an input shift register being read by feature detectors at each step of the input data through it so that the input shift register effectively comprises a window being scanned along a waveform through which a series of overlapping portions of the waveform are observed in turn.

The decision means may comprise assignment means for assigning to each of said portions of data in dependence on the features detected in said portions by said feature matching device a corresponding label from a reference set of labels and a corresponding confidence measure indicating a degree of confidence in the correct assignment of the corresponding label; an output buffer means for storing values corresponding to a plurality of said successive portions of data forming a one dimensional array said values comprising for each portion of data, timing information defining the position in time of said portion relative to others of said portions and a label and corresponding confidence measure assigned to the portion by said assignment means and output means for outputting as electronic recognition signals from said output buffer means, labels and timing information corresponding to those portions in said array whose corresponding confidence measures in said output buffer means are in a predetermined relationship with the confidence measures in said output buffer means corresponding to a sub-array of neighboring portions in said array.

Such an arrangement using a buffer for storing values in which labels have already been assigned to the portions of a one dimensional array before output decisions are made enables the system to operate continuously if required without any need for segmentation. Since the decision made by the output means depends on the relative magnitude of the confidence measures for adjacent portions rather than the absolute confidence measure in respect of each portion the system is less susceptible to being either too discriminatory or not discriminatory enough in locating recognized waveform portions while still being able to operate in a continuous fashion if required. Furthermore since the system may be operated continuously many recognition problems may be overcome by suitable selection of the length of the buffer particularly if a limited set of waveforms are to be recognized.

According to a further aspect of the present invention there is provided a recognizing system comprising means for the input of electronic data to be recognized, decision means for outputting as electronic recognition signals labels corresponding to portions of said data and chosen from a reference set of labels wherein said decision means comprises assignment means for assigning to each of successive portions of said data in dependence on said successive portions of data a plurality of labels from a reference set of labels and corresponding confidence measures indicating a degree of confidence in the correct assignment of each label; a plurality of buffer means each for storing values corresponding to a plurality of successive portions of data forming a one dimensional array said values comprising for each portion of data, timing information defining the position in time of the portion relative to others of said portions and one of said labels and the corresponding confidence measure assigned to the portion by said assignment means and each for containing labels having corresponding confidence measures of a predetermined rank relative to those of other labels assigned to the same portion of data, one of said buffer means being an output buffer means containing values whose corresponding confidence measures indicate the highest confidence in the correct assignment of the corresponding label of all labels in said reference set in respect of the corresponding portion of data and output means for outputting as electronic recognition signals, labels and timing information from said output buffer means corresponding to those portions in said array whose corresponding confidence measures in said output buffer means are in a predetermined relationship with the confidence measures in said output buffer means corresponding to a sub-array of neighboring portions in said array when the confidence measures of labels in the others of said buffer means satisfy predetermined conditions.

Such an arrangement not only confers the advantages of using a single buffer as described above but also enables additional recognition problems to be overcome, particularly in the context of voice recognition where words have to be recognized which only differ in the presence or absence of endings. The arrangement enables in effect a decision about a particular portion of a waveform or other data to be postponed until it has been ascertained that other possible label assignments fulfil certain conditions and in this respect is generally applicable to other recognition problems which involve the recognition of electronic data.

Preferably this aspect of the present invention further comprises a feature matching device comprising a plurality of feature detectors arranged in operation to detect any occurrence in successive portions of said data of any of a plurality of respective features and said decision means is for outputting said labels in dependence on the features detected by said feature matching device in said sucessive portions and said assignment means is for assigning said labels and corresponding confidence measures in dependence on the features detected by said feature matching device in said successive portions. More preferably the features comprise the combined presence at a plurality of instants spaced at predetermined intervals relative to each other in time of instantaneous amplitudes each satisfying respectively predetermined contraints.

Preferably in the first aspect of the present invention said assignment means is for assigning a plurality of different labels from said reference set of labels and corresponding confidence measures indicating a degree of confidence in the correct assignment of each label to each of said successive portions of data in dependence on the features detected in said portions by said feature matching device and said decision means further comprises a plurality of other buffer means each for storing values corresponding to said plurality of said successive portions of data forming said one dimensional array said values comprising for each portion of data, timing information defining the position in time of the portion relative to others of said portions and one of said labels and corresponding confidence measures assigned to the portion by said assignment means and each for containing values comprising labels having corresponding confidence measures of a predetermined rank relative to those of other values corresponding to the same portion of data and wherein said output buffer means contains values whose confidence measures indicate the highest confidence in the correct assignment of the corresponding label of all labels in said reference set in respect of the corresponding portion of data and wherein said output means outputs said electronic recognition signals when the confidence measures of labels in the others of said buffer means satisfy predetermined conditions.

When the present invention is provided with a plurality of buffer means preferably the output means in operation stores and delays outputting the recognition signals for a predetermined time if the confidence measures corresponding to the same sub-array of neighboring portions stored in any other buffer means indicate an increase in the confidence of the correct assignment of any of their corresponding lables with time and replaces said stored recognition signals with any recognition signal subsequently recognized during said predetermined time having a confidence measure indicating a greater confidence in the correct assignment of the corresponding label than that of said stored signal and outputs the recognition signal in said store at the end of said predetermined delay.

In effect a signal is output if at the time the initial assignment is made there are no other less likely label assignments which are increasing in confidence. If there are any less likely label assignments which are increasing in confidence the initial signal is preferably stored and only output if none subsequetly become more confidently assigned candidates for output than the initial signal before a predetermined length of time has elapsed. If the other initially less confident assignments do become more confident than the initial assignment before the predetermined length of time has elapsed and are thus entered in the buffer containing the labels assigned with the highest confidence measures then they may preferably replace the initial stored signal and be output in preference to the initial label to be output providing the usual conditions for output are met. It is thus possible to correctly distinguish between waveforms and words differing only in their suffixes even though they may have common prefixes which in other systems lead to premature misrecognitions.

Whether one or a plurality of buffer means are used the decision to output a signal from the output buffer means is preferably made in respect of those portions whose corresponding confidence measures in said output buffer means indicate a degree of confidence in the correct assignment of their corresponding labels which is greater than that indicated by each of the confidence measures in said output buffer means corresponding to a sub array of neighboring portions in the array. The output means then in effect search for maxima in the confidence measures corresponding to the neighboring portions in the array in the output buffer means. The maxima may be searched for only in respect of the immediately preceding and immediately succeeding portions to that to be output or with respect to several preceding and several succeding portions in the array. However other suitable relationships between the confidence measures of portions in respect of which labels are to be output and those of their neighboring portions in the array can be used as appropriate.

Preferably the output means is for outputting electronic recognition signals if the label to be output has a corresponding confidence measure indicating a greater degree of confidence in its correct assignment than that of any of the labels corresponding to a predetermined number of succeeding portions in said array. This enables the rejection of false recognitions of adjacent portions of a waveform. The number of succeeding portions of the array studied is preferably chosen so that it represents a time interval small compared to the duration of a spoken word or other waveform pattern to be recognized so that maxima corresponding to adjacent words are not confused.

Preferably the buffer means function as one or more shift registers and tests on the confidence measures of said labels in said buffer means are conducted at the input to each buffer means and labels and timing information output from the output of the output buffer means if before the label to be output has reached the output no further confidence measure maxima greater than that to be output have been detected at the input of the output buffer means.

Such an arrangement may in effect utilize the buffer shift register as the store for recognition signals to be output and as the timing device for deciding when the predetermined time has elapsed at the end of which the recognition signal is to be output from the store. Whether such a shift register is used or not, if more than one buffer is used, the output buffer means should preferably only contain values for portions of data corresponding to a total time length less than the time duration of a waveform to be recognized.

Preferably the feature matching device comprises an input shift register comprising a series of cells through which data from said input means can be continuously passed said feature detectors each being connected to cells corresponding to the instantaneous amplitudes to be detected and means for reading the feature detectors simultaneously at each step of said data through said register and comparing the readings from each of said feature detectors with predetermined reference vectors each corresponding to a label from said reference set of labels and assigning that label whose reference vector most closely matches said readings together with a corresponding confidence measure to the portion of said waveform corresponding to the portion of data in said register which produced said readings.

Preferably the input shift register contains data corresponding in time duration to at least the length of the longest waveform portion to be recognized and the labels are assigned at each step of said data through said input shift register. This facilitates operation of the system in a continuous and constructionally convenient manner.

Alternatively the input shift register may contain data corresponding in time duration to at least the length of the longest feature to be detected and the feature matching device may comprise a cumulative store in respect of each feature detector the content of said stores indicating whether a feature has been detected since the store was last cleared and the contents of the stores being compared with said reference vectors at each step of said data through said shift register and said cumulative stores being cleared after a predetermined time which is preferably after each a label is output from the system.

Embodiments of the present invention will now be described in detail with reference to the following drawings in which:

BRIEF DESCRIPTION OF THE DRAWINGS

FIG. 7 shows how different features may be interleaved in a RAM.

FIG. 8 is a block diagram of the circuit of the hardware corresponding to FIGS. 5 and 6.

DESCRIPTION OF THE PREFERRED EMBODIMENT(S)

Figure 1:
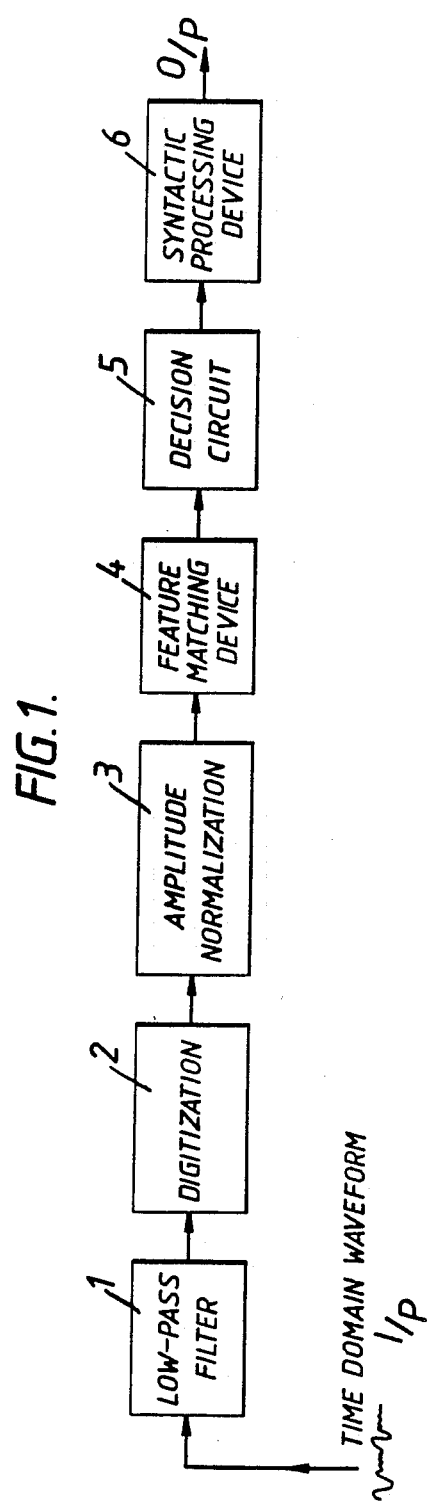
FIG. 1 shows a schematic block diagram of an embodiment of a waveform recognition system according to the present invention.

In FIG. 1 a schematic diagram of a waveform recognition system according to an embodiment of the present invention is shown. The signal in the form of a time domain waveform, which in the case of speech waveform recognition could be obtained from a suitable microphone, is first passed through a low pass filter (1) to suppress aliasing effects. The signal is then sampled at a suitable rate and digitized (2). The use of a low pass filter is not essential though, unless aliasing destroys all the distinguishing information in the signal.

The signal may then be normalized in energy by a conventional automatic gain control processing stage (3). This stage again is not essential and if the loudness of the signal is itself a distinguishing feature such energy normalization may be omitted.

The normalised signal is then passed to a feature matching device (4) which detects the present or otherwise of a set of features in the waveform. During each sample period this device constructs a binary vector or list of feature occurrences detected and passes it to the decision circuit.

The decision circuit (5) then analyzes the successive feature lists and compares them during each sample period with a set of labelled reference feature lists each corresponding to a waveform to be recognized in order to identify the closest reference feature list or lists. Labels and confidence measures for the closest reference feature lists are then asigned and output together with information identifying the time of recognition to the syntactic processing device (6).

The syntactic processing device (6) accepts a sequence of recognition labels and recognition times from the decision circuit. Labels are rejected if they conflict with the syntactic constraints of the recognition task. The device may substitute other labels if rules derived from contextual evidence permit.

Figure 2:
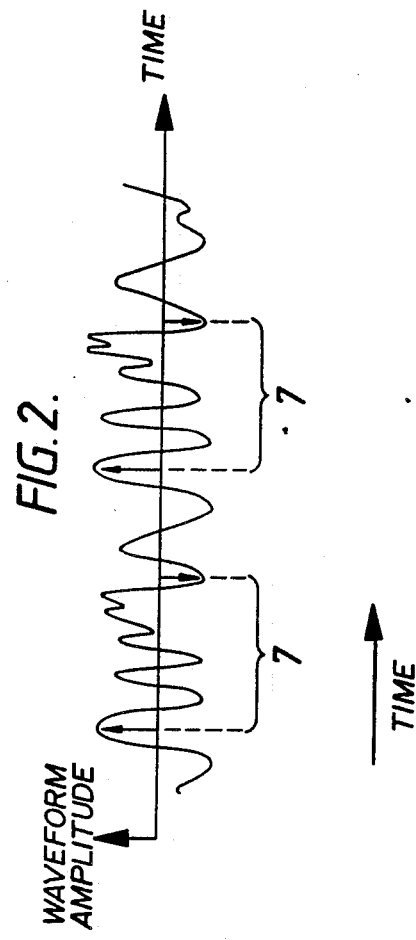
FIG. 2 shows a feature as used in an embodiment of a waveform recognition system according to the present invention matching a waveform in two positions.

The feature matching device (4) in FIG. 1 detects the presence or absence of a number of features in a time domain representation of the waveform to be recognized. The features comprise tests of amplitude all of which must be simultaneously satisfied for the feature to be present. FIG. 2 shows such a feature (7) matching a waveform in two different positions. The tests are preferably of whether the amplitude of the signal is greater than a specific value at a specific time or less than a specific value at a specific time. However any other suitable such tests may be used for example the amplitude may be required to be within two or more limits. The times of the tests are specified relative to the times of the other tests comprising the feature. Each feature can consist of any number of such tests separated by fixed time intervals of any length. Generally the tests would preferably not include more than 5 such tests or extend over a time period longer than the duration of the longest waveform or word in the vocabulary to be recognized.

The tests necessary to establish the presence or absence of the above features in the waveform to be recognized may be carried out in a number of ways using either analogue or digital circuitry. Preferably though the tests are conducted using digital circuitry as shown in FIG. 1 in which a digitizer (2) is used. This is preferably achieved by passing the sampled and digitized waveform values down a shift register which is clocked in synchronism with the sample frequency. In this manner the system in effect studies a series of overlapping portions of the input waveform each portion being formed by the contents of the shift register. Each stage of the shift register thus contains one digital word corresponding to the amplitude of the corresponding sample of the waveform. A set of taps may then be taken from predetermined stages of the shift register test the values in the shift register stages to which they are connected. Feature detectors are connected to the taps to test for the combined presence of values which satisfy the conditions for a respective feature in the stages of the shift register to which the taps are connected. Thus in testing for the presence of a feature the time interval between the tests making up a feature corresponds to the spacing between the taps. The shift register is preferably at least as long as the time interval occupied by the longest feature.

The waveform as it is passed down the shift register thus presents all possible time shifted versions to the feature detectors. If at any instant all the tests for any particular feature are found to be satisfied the feature is noted as being present. Many such feature detectors may be connected to the shift register and many taps corresponding to tests for a plurality of features may be connected to any one shift register stage. Multiple connections to shift register elements however, could lead to a high density of interconnect and difficulties in VLSI implementation. The connections for each feature do not need to overlap providing the detection delay corresponding to the spatial separation of the taps is compensated. Thus it is possible for taps to be connected via delay circuits to shift register stages other than those to which they would be connected if no delay circuits were used. Such a construction can be useful in a VLSI implementation where the number of connections to each shift register is preferably kept low.

Test configurations for each feature are ideally chosen so that they appear in more than one class of waveform. This ensures that the recognizer extracts as much information from the input signal as possible and provides immunity to certain forms of noise. Conventional template matching systems seek only to obtain matches with single classes of patterns and suffer from an increasing error rate as the number of classes also increases. The selection of the test configurations for features may be carried out by trial and error or automatically using a suitable algorithm and the most suitable set of features will depend on the recognition task to be performed.

It is important to observe that variations in the duration of waveforms or spoken words will not necessarily affect the presence or otherwise of the features described above. The time of their detection will certainly vary, but the phonetic events in speech which they detect will still be present. This means that computationally intensive Dynamic Time Warping methods can be avoided.

The flexibility of the feature tests achieves economies by allowing recognition to be concentrated on only those acoustic events necessary to distinguish vocabulary words. For example in the recognition of the digits it is not necessary to recognize "th" as well as "e" in the recognition of "three" in the matching methods in which the recognition of "three" is just as much affected by the redundant "th" as it is by "e".

Another advantage of this approach is that words can be recognized before the utterance has been completed. For example once the "i" in "six" has been detected, the word can be uniquely identified in the 10 digit vocabulary. Whole word template matching though necessarily requires for best results that the complete utterance is available for recognition computations and hence a decision cannot be given before the end of the word.

Once the features have been identified in a waveform they may be utilized in two main ways. During each sample period the device may either construct a binary vector comprising a list of feature occurrences detected during that sample period alone and compare the list compiled with the reference set of feature lists or the device may construct a list of feature occurrences which is stored in a cumulative store which lists all those features which have been detected since the cumulative store was last cleared. In the latter case the store is preferably cleared after each recognition has occurred and been output from the system. In the former case the portion of waveform for which the sample feature lists are compiled are of constant time duration and are preferably the same length as that the input shift register corresponds to. In the latter case the sample feature lists compiled are of increasing length and may be of longer duration than that the input shift register corresponds to.

Figure 3:
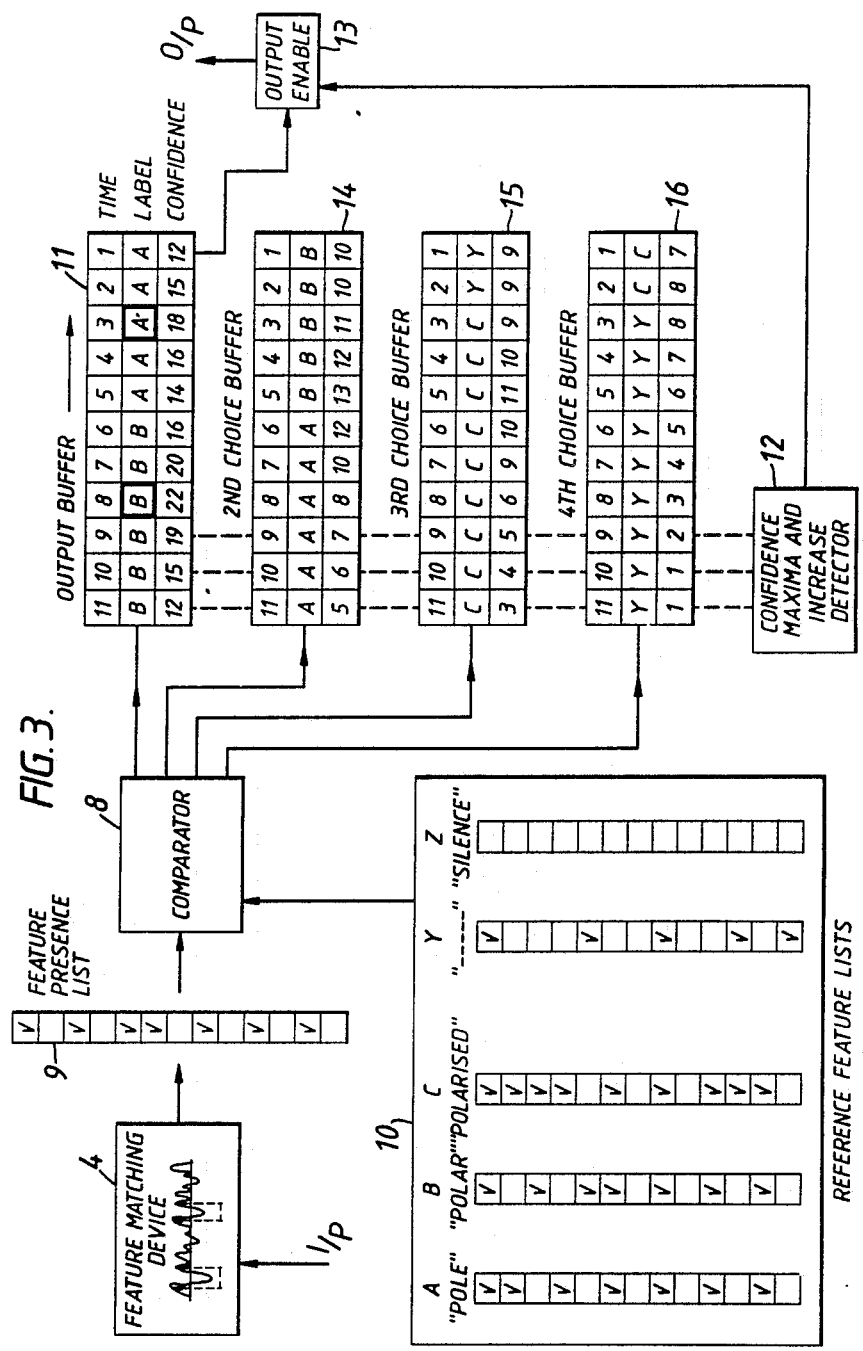
FIG. 3 shows a schematic diagram of one embodiment of the decision circuit used in an embodiment of the present invention.

In either case though the feature lists are then compared with a reference set of feature lists using a comparator circuit which is for example one as described in U.S. Pat. No. 4,119,946. As shown in FIG. 3 the comparator circuit (8) compares the sample feature list (9) whether it comes from a cumulative store in the feature matching device (4) or direct from the feature detectors of the feature matching device (4), at each step of the data through the input shift register, with a set of reference feature lists (10) each corresponding to a word in the system's vocabulary and then works out a confidence measure indicating the degree of confidence in the correct assignment of each label in the set to the corresponding portion of data. At least one reference feature list is labelled with the silence category and very low amplitude signals, noise or meaningless signals would tend to be assigned this label by the decision circuit. The measure of closeness taken is preferably the number of differences between the sample and the reference lists and may be computed very rapidly for a very large number of binary references for example by using the methods described in U.S. Pat. No. 4,119,946. In this case a low value of the smallest reference distance measure will signify a high value for the confidence of the corresponding label decision. Other suitable comparator means may of course be used to calculate other measures of the closeness and therefore confidence measures in the correctness of the assignment of the labels if required.

In a first embodiment of the present invention the comparator outputs to a single output buffer (11) that label together with it's corresponding confidence measure and an indication of the time of recognition which the comparator has found to have the reference feature list closest to the sample feature list i.e. that having the highest confidence measure in the correctness of it's assignment. Thus a continuous series of assignments of labels and corresponding confidence measures are generated as the waveform passes through the system.

The decision circuit preferably retains the last N label assignments with their corresponding timing information and confidence measures in the buffer (11). When a maximum in the degree of confidence in the correct assignment of the labels and thus confidence measures (a confidence measure maxima) is found in the buffer which is preferably not exceeded by any of the N succeeding measures the corresponding label together with the time of the confidence measure maximum with which the label is associated are then output from the buffer by the decision circuit. N may be chosen so that it represents a time interval small compared to the duration of a spoken word or other waveform pattern so that maxima corresponding to adjacent words are not confused. The length of the buffer may correspond to the length of time corresponding to the last N label decisions or to a greater length of time and may operate as a shift register in which case the label to be output may be output from the end of the shift register if a maxima detector at the input to the buffer has not detected any greater maxima since that to be output and within N succeeding assignments. For example in FIG. 3 in the output buffer (11) there are two maxima at times three and eight which have been detected by the maxima detector (12). The maxima detector (12) analyzes the confidence measures of, in this case, the three most recent labels entered into the output buffer (11) and looks for maxima. However the maxima detector could study a greater number of labels. If the number N is set to be four or less then both the labels will be output by the detector (12) enabling the output enable (13) at the end of the output buffer shift register (11). If N is set to be greater that four then the higher confidence measure of the latter label (which is twenty two in contrast to eighteen for the former) will result in the latter label only being output when it reaches the end of the shift register.

If the system is being operated with a cumulative sample feature list store as described above then following detection of a output label by the maxima detector (12) all records of features occurring before the instant of recognition and for the short time after needed to detect the maxima are deleted from the feature list (9) obtained by the feature matching device. This prevents features occurring in earlier words from interfering with the recognition of those following. It also enables continuous speech to be recognized without utilizing additional processing resources for segmentation as is customary in conventional recognizers.

However, an extremely difficult problem which conventional recognizers cannot handle without employing considerable processing resources arises when the vocabulary to be recognized contains words which themselves consist in part of other words in the vocabulary (this problem is not normally addressed in OCR but it is unavoidable in Speech Recognition). Some examples such as distinguishing between "sandwich" and "sand which" can be resolved by the syntactic processing device which follows the decision circuit. However, words such as "pole, polar, polarize and polarized" cannot always be distinguished thus. Conventional dynamic time warping methods rely upon the parallel application of all templates in the vocabulary, only making word boundary decisions after a syntactically correct sequence of words has been satisfactorily matched. This approach is not feasible for a large vocabulary because of the enormous computational resources required.

This problem can be solved by a further preferred embodiment of the present invention in which the comparator outputs labels and confidence measures for a plurality of the most confident class label assignments from the comparator means each to a separate buffer together with their confidence measures and timing information. Preferably the top 3 or 4 class choices only are monitored and thus 3 or 4 buffers are used each containing respectively the 1st (11), 2nd (14), 3rd (15) and 4th (16) choice of label for any one sample period.

Figure 4:
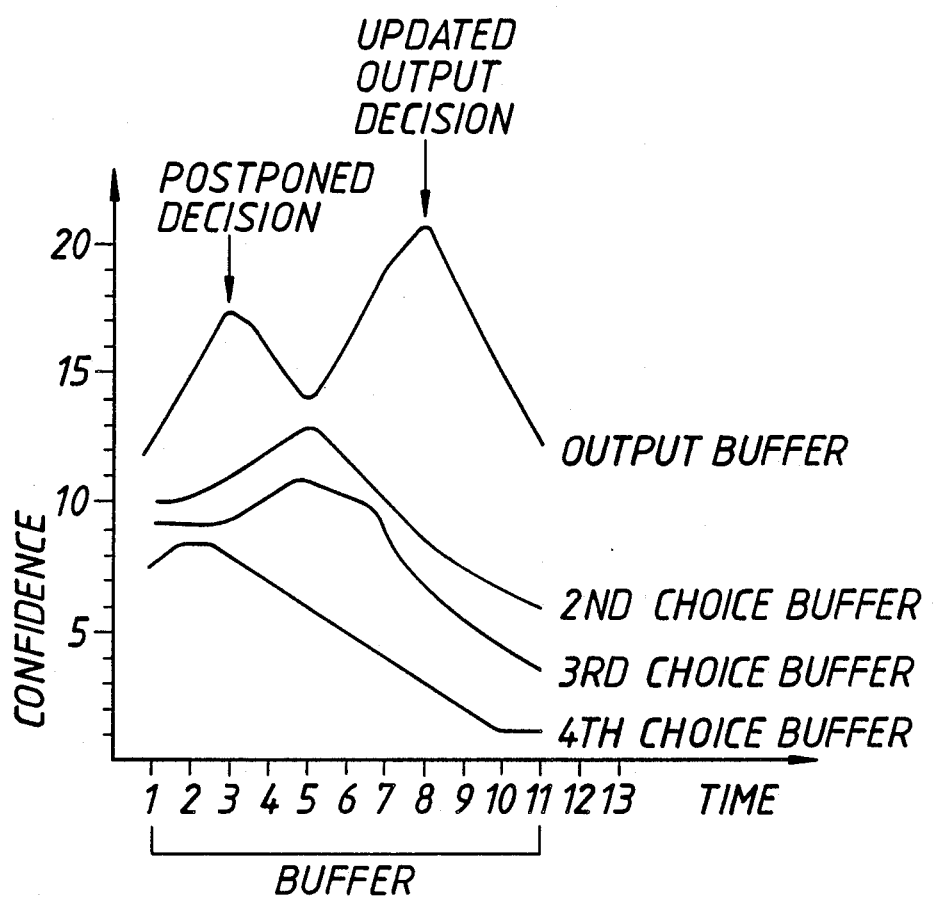
FIG. 4 shows graphic representations of the contents of the buffers shown in FIG. 3.

For example the above difficulty might be manifest by the incorrect recognition of "polar" as "pole" followed by an unrecognizable segment. However, the problem is overcome by this embodiment of the present invention by postponing the "pole" decision if the confidence of one or more other class decisions (e.g. "polar, polarize") are detected to be rising at the same time that the "pole" recognition is made. This can be seen from both FIG. 3 and FIG. 4 where the 2nd and 3rd choice buffers contain labels whose confidence measures are increasing at the time that the postponed decision to output label A corresponding to "pole" is made by the detection of the corresponding confidence maxima at time three. If the next candidate label for output (i.e. the next label having a confidence measure maxima, in this example label B corresponding to "polar") corresponded to a class whose confidence was rising at the time of the postponed decision, it would be output instead as an updated classification decision by the decision circuit (as will "polar" in this example at time eight). This decision would again be postponed if the same criterion applied as before (e.g. if the confidence measure for label C in the 3rd choice buffer were increasing at time eight when the maxima for "polar" was detected). If however, the rising confidence levels did not subsequently reach a significant maxima greater than that of the postponed decision, the original postponed decision would be output (in this example the label C increases in confidence at times one to five but never reaches a value higher than those for labels A and B).

A label would be considered to have a confidence measure which was rising if the confidence measures associated with that class of label at that time exceeded all those preceeding it in the output buffer (14, 15 or 16) or if the confidence measure at that time satisfied some other gradient detection rule.

If the cumulative feature list store is used as described as above then with this embodiment of the invention the feature list should not be deleted following a decision which is to be postponed pending a possible update. The buffers however must correspond to a length of time at least as long as the predetermined time which one must wait before stopping the search for a better maxima than that already detected which can be used to update it. The buffers preferably operate as shift registers as shown in FIG. 3 and the label to be output is output from the end of the shift register containing the labels assigned with the highest confidence measures (the output buffer) (11) if a maxima and increase detector (12) at the input to that shift register has not detected any greater maxima since that of the initial output decision within N succeeding assignments and the initial output is not to be updated by being replaced by an output label which was found to be increasing in confidence in one of the other shift register buffers by the maxima and increase detector (12) when the initial output decision was made and which subsequently became a more likely candidate for output than the initial output label before the initial output label reached the output of the buffer. For example in the case where two labels with confidence measure maxima which are to be output are in the output buffer but there was no label in any of the other buffers with a rising confidence measure at the time the initial output decision was made then both the labels in the output buffer are output.

The volume of additional hardware in the decision circuit necessary to recognize words containing others within them depends upon the depth of nesting encountered. For most applications only the confidence measures and label decisions of the top 3 or 4 class choices need be monitored for upward gradients at any one time, and buffers for the most recent labels timing information and confidence measures for each of these class choices provided. In practice the buffers for the 2nd 3rd and 4th choices need only be as long as is necessary to detect any increasing confidence measures at the time the initial output decision is made and thus need not be as long as the output buffer if the output buffer is used as is shown in FIG. 3 to store postponed decisions.

Figure 5:
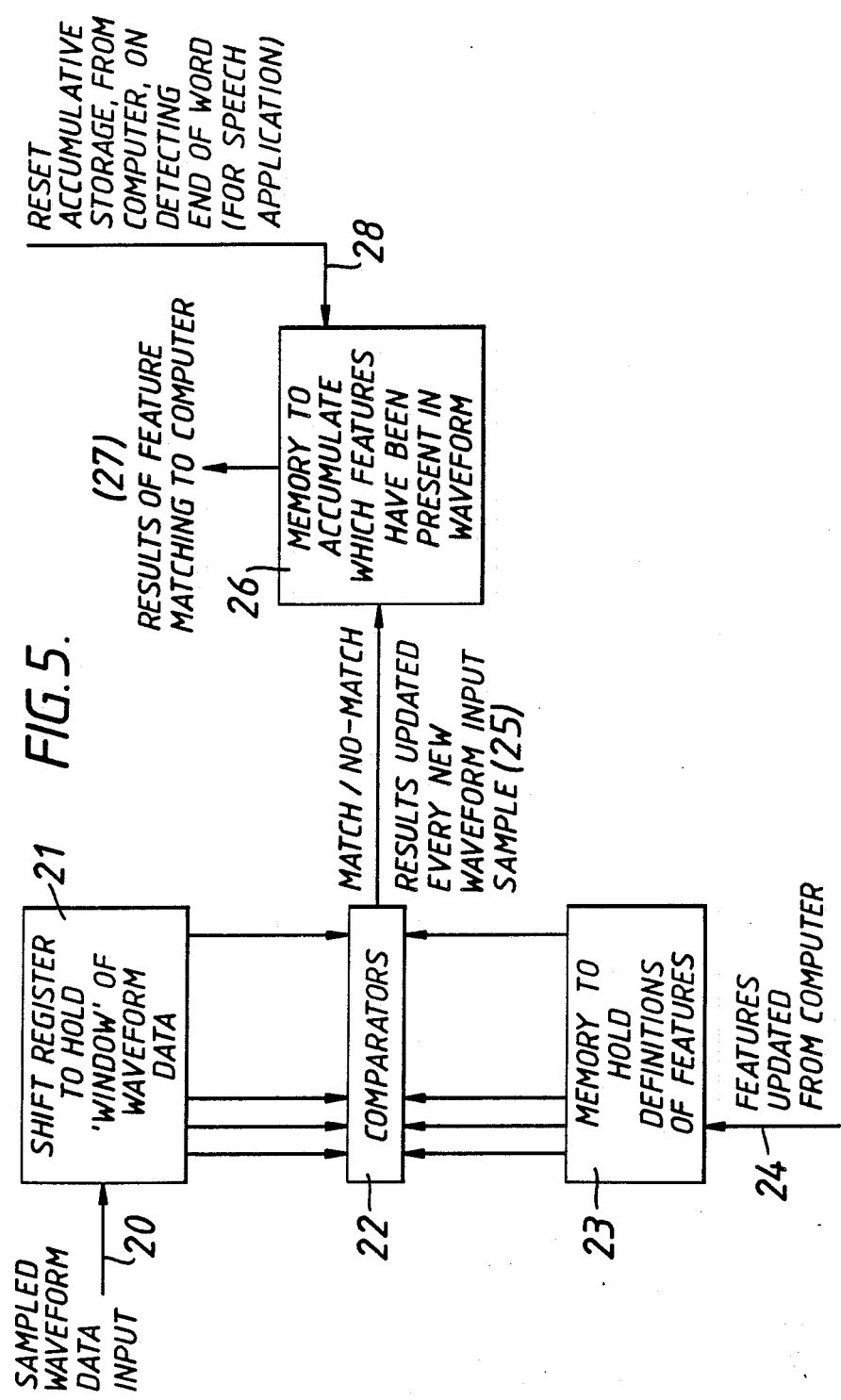
FIG. 5 is a block diagram representing the functions of a further embodiment according to the present invention.

The functional block diagram of a hardware embodiment of a particular waveform recognition system according to the present invention is shown in FIG. 5. The hardware inputs waveform samples 20 into a shift register 21. Comparators 22 are used to detect the presence of features stored in memory 23, in the 'window' of waveform data held in shift register 21. The features which are being searched for can be updated by changing the features stored in memory 23. The presence or absence of a match, signifying the presence or absence of the revelant features in the waveform data stored in shift register 21, is signalled to a further memory 26 which accumulates a record of which features have been detected in the sampled waveform. The results 27 of feature matching are output from memory 26 to the controlling computer. The memory 26 can be reset by the controlling computer on line 28 at the end of a sampling period—which may occur, in speech recognition applications, on detecting the end of a word.

Figure 6:
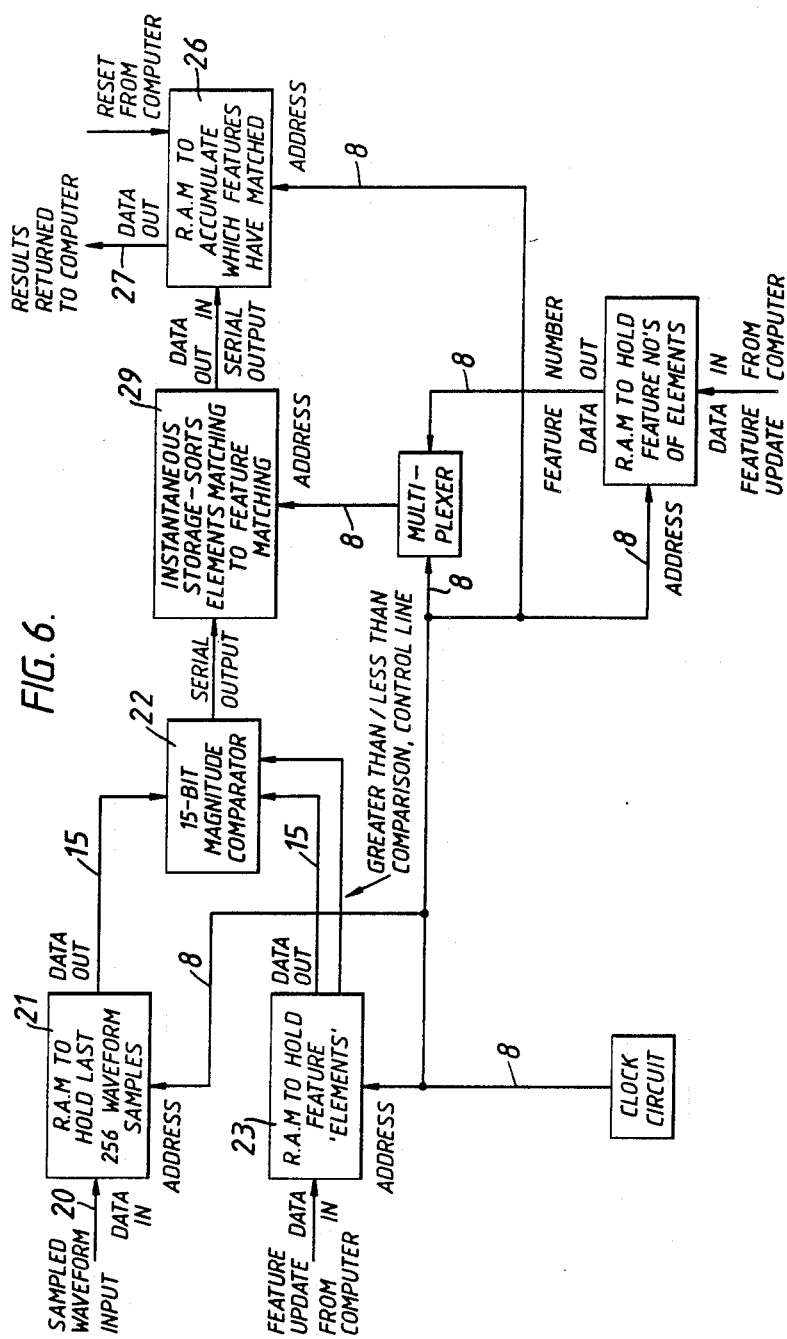
FIG. 6 is an overall block diagram of the hardware corresponding to FIG. 5.

FIG. 6 is an overall block diagram of the hardware.

The hardware performs four distinct functions: storage for the last 256 waveform samples; storage to hold feature definitions; feature detection; and accumulative storage to register which features have been detected in the sampled waveform since the store was last reset.

Since each 'feature' consists of one, two or three 'elements' (instantaneous amplitudes each satisfying respectively predetermined constraints) separated by a number of features within a memory device so that no two feature 'elements' occur at the same sampling point. This concept is best explained with reference to FIG. 7 which shows how three features which together comprise seven elements covering seven samples can be packed into nine consecutive locations in the feature definition RAM (the values in two of the locations being indeterminate).

With computer optimization of the placing of the features within the memory it is possible to pack up to 100 features in a storage space of 256 locations. The hardware whose generalized circuit is shown in FIG. 8 can in fact define a maximum of 256 unique features, but the size of memory used limits the number of features which can be stored.

This packing process enables the processing speed of the hardware to be increased by a factor of N over the software simulation, where N is the number of features effectively processed in parallel. The circuitry described here with reference to FIGS. 5, 6 and 8 uses approximately 60 readily available TTL and memory devices, and will process around 100 features effectively in parallel, giving an increase in speed of a factor of 100. Moreover, the hardware may itself be extended or paralleled to yield further improvements in throughput.

Although specifically designed for feature matching of speech waveforms, this hardware is of use in many pattern matching applications. One example, which is more fully detailed below, is that of character string matching with text data. The hardware described here could search for approximately 30 eight character words simultaneously at a rate greater than two full A4 pages of text per second.

In FIG. 6 an 'instantaneous' storage register 29 has one bit per feature; the sign of that bit indicating whether or not that feature is present in the current 'snapshot' of the waveform. Initially, all these bits are set to 'true' (ie feature present). All the feature elements held in RAM23 are sequentially compared, in comparator 22, with the corresponding waveform sample from RAM21 (which is configured as a shift register). If a feature element in RAM23 does not match the waveform sample, the bit in register 29 corresponding to that feature is set to "false". After comparing all the elements from RAM23, the only bits in register 29 that remain set "true" correspond to the features that have matched the waveform sample. The result from the register 29 is passed to the "accumulative storage" RAM26 where a record of the features that have been matched is stored. This process is repeated for each new waveform input into RAM21, thus effectively scanning the waveform across all the features stored in RAM23. Of course, by loading different values into RAM23 it is possible to search for different features or different combinations of features.

The circuit of the hardware described above with reference to FIGS. 5 and 6 is shown in greater detail in FIG. 8. The particular application of this hardware is to process real-time speech samples. For a speech waveform bandlimited for a telephone channel, a minimum sample cycle frequencey of 8 KHz is required. The hardware described here achieves a cycle frequency of just under 10 KHz.

A divider chain 31, driven from a master clock oscillator 32, generates control signals 33, a fast address counter 34 and a slow address counter 34. The fast address counts from 0 to 255 between each new input sample. The slow address increments on each new sample.

By adding the fast and slow address together a count 36 is generated which configures a RAM22 effectively as a shift register. Each new waveform sample overwrites the oldest stored sample, thus forming a cyclic store of the most recent 256 samples. Relative to the data in the feature RAM23 the input waveform is seen to scan across all locations. This operation is illustrated by the following:

| Location | 0 | 1 | 2 | 3 . . . | 254 | 255 | sample |
|---|---|---|---|---|---|---|---|
| Physical location | 100 | 101 | 102 | 103 . . . | 98 | 99 | period |
| Data | 30 | 36 | 55 | 63 . . . | 112 | 108 | 1 |
| Logicl location | 0 | 1 | 2 | 3 . . . | 254 | 255 | sample |
| Physical location | 99 | 100 | 101 | 102 . . . | 97 | 98 | period |
| Data | 26 | 30 | 36 | 55 . . . | 129 | 112 | 2 |

(Where 26 is the value of the new sample read in. The oldest sample of 108 has been 'lost' off the end of the shift register.)

Between the inputting of each new waveform sample the contents of each logical location (0-255) in RAM22 is compared with the contents of the 'static' feature RAM23.

The comparator 37 compares the magnitude of two absolute 15-bit integers; one further bit from the feature RAM determines whether the magnitude of the feature element should be less than or greater than the waveform magnitude to generate a 'true' output. Note that for the implementation of a character searching system only an equality condition is required from the comparator.

If the output of the comparator is 'false'; then the appropriate bit in the instantaneous storage register 29 is reset. A 'true' output is ignored so that the instantaneous storage remains at 'false' if any element of a particular feature has not matched the waveform. In the present embodiment the logical convention used is '1' for 'true' and '0' for 'false'.

The instantaneous storage consists of some pipelined circuitry. This is used to achieve the required cycle period. In effect the output results are delayed by one sample period, but the data throughput rate is maintained. The three way pipelined storage functions as follows:

TIME SLOT 1

RAM38: all bits are set true
RAM39: bits corresponding to feature elements that do not fit are set false
RAM40: state of all bits are read out sequentially

TIME SLOT 2

RAM38: bits corresponding to feature elements that do not fit are set false
RAM39: state of all bits are read out sequentially
RAM40: all bits are set true

TIME SLOT 3

RAM38: state of all bits are read out sequentially
RAM39: all bits are set true
RAM40: bits corresponding to feature elements that do not fit are set false.

The process then repeats from time slot 1.

This pipelining enables all the above functions to take place simultaneously without decreasing the overall cycle time. The 2-way accumulative pipelined memory simply writes the data into one register while reading from the other, and vice-versa in the other sample period. As the serial to parallel converter is connected to the data input side of the accumulative memory, no extra delay is introduced.

The result of the matching operation is returned to the host computer as 32 eight bit bytes. These represent which of the 256 features (theoretical maximum) have been present in the waveform since the accumulative storage was last reset. Bits corresponding to features that have not been defined are simply ignored.

With very little modification, the feature matching circuitry of FIG. 8 may be adapted to implement a high speed character string search system. This is potentially very useful for text processing or database handling programs where speed is vital.

The modification is simply to change the output of the comparator section of the hardware so that a 'true' output is generated when the value of the data sample is precisely equal to the value of the feature element. The feature data is then replaced with the ASCII values (or whatever representation is being used) of the string to be searched, and the whole text is input, character by character through the data buffer (at 10 KHz).

By labelling each character with its associated string, several different strings may be searched for in one operation. Thus, up to 256 individual characters (equivalent to 32 8-character words) may be searched for in one pass. The data throughput rate is again 10 KHz, which is equivalent to more than two full A4 pages of text per second.

In addition, the search system may contain "wildcard" characters simple by omitting characters in the relevant places. An example of data loading to match the strings, "Thank you", "pre", and "hoo*" (where '*' signifies any character) would be:

where string number 0 is the null string number, and X is any character.

Clearly if the hardware was being used for this application only, an 8-bit data path would be sufficient for English ASCII text; this would significantly reduce circuit complexity.

Clearly this circuitry is potentially very useful in keyword spotting for database applications. This includes searches for telephone numbers, car numbers, or parts thereof etc. It could also be useful for establishing which of a set of keywords are present in a corpus of text, perhaps for classification purposes. As shown above, searches for strings with wildcards/partial information are possible.

With a 15-bit data path, 32768 symbols can be searched for, making this application applicable to all languages.

I claim:

1. Speech recognition apparatus comprising:
   (a) input means for receiving, in successive overlapping temporal portions, an electrical signal containing speech data;
   (b) a feature detection device responsive to said electrical signal over a temporal portion thereof for detecting the presence of a plurality of predetermined features within said portion; and
   (c) decision means for indicating recognition of elements of speech, each said element corresponding to the presence of a predetermined combination of said detected features, the said decision means including:
      (i) assignment means for assigning a label corresponding to one of said elements of speech to each said portion in dependence on the features detected therein, together with a corresponding confidence measure indicating the degree of confidence in the correctness of the assignment of that label;
      (ii) an output buffer connected to said assignment means for storing values corresponding to a plurality of said successive portions forming a temporal array, said values comprising, for each said portion, timing information defining the relative position in time of that portion, and the label and corresponding confidence measure assigned to that portion; and
      (iii) output means for indicating recognition of an element of speech, by outputting from said output buffer the labels and timing information for those portions in said array whose corresponding successive confidence measures define local maxima in said array.

2. A speech recognition apparatus according to claim 1 wherein:
   said assignment means includes means for assigning a plurality of different labels from a reference set of labels and corresponding confidence measures indicating a degree of confidence in the correct assignment of each label to each of said successive portions of data in dependence on the features detected in said portions by said feature detection device;

| MEM LOCATION | 0 | 1 | 2 | 3 | 4 | 5 | 6 | 7 | 8 | 9 | 10 | 11 | 12 | 13 | 14 | 15 | 16 | 17 | 18 | 19 | 20 ... |
|---|---|---|---|---|---|---|---|---|---|---|---|---|---|---|---|---|---|---|---|---|---|
| CHARACTER | | T | h | a | n | k | | y | o | u | | p | r | e | h | o | o | X | | X | X X ... |
| STRING NO: | | 1 | 1 | 1 | 1 | 1 | 1 | 1 | 1 | 1 | 1 | 2 | 2 | 2 | 3 | 3 | 3 | 0 | 3 | 0 | 0 0 | said decision means further comprises a plurality of other lower rank buffer means, each of successively lower rank for storing different respective values corresponding to said plurality of said successive portions of data and forming for each rank a one dimensional array for each portion of data, having (i) timing information defining the temporal position of the portion relative to others of said portions, (ii) one of said labels and (iii) a corresponding confidence measure assigned to that portion by said assignment means;

said output buffer means contains values having confidence measures which indicate the highest confidence in the correct assignment of the corresponding label of all labels in said reference set in respect of the corresponding portion of data; and said output means outputs electronic recognition signals when the confidence measures of labels in the others of said lower rank buffer means are not rising with respect to time.

3. Pattern recognition apparatus comprising:
(a) means for receiving an input electrical signal;
(b) decision means for indicating recognition of reference pattern elements by outputting corresponding reference labels for portions of said signal, said decision means including assignment means for assigning, to each of said portions, a plurality of said reference labels together with corresponding confidence measures indicating the degree of confidence in the correctness of assignment of each such label;
(c) a plurality of buffer means, each for storing values corresponding to a plurality of successive said portions and forming a temporal array wherein said values include, for each said portion, (i) timing information defining the relative position in time of the portion, (ii) one of said labels and (iii) the corresponding confidence measure, and each buffer means containing labels having corresponding confidence measures, one of said buffer means being an output buffer means containing values whose corresponding confidence measures indicate the highest confidence in the correctness of assignment of the corresponding label of all labels in said reference labels in respect of the corresponding said portion; and
(d) output means for indicating recognition of a pattern, by outputting from said output buffer means, labels and timing information corresponding to those portions in said array whose successive confidence measures define local maxima in said array, when the successive confidence measures of labels in the others of said buffer means are not rising with time.

4. Apparatus according to claim 3 wherein said output means operates to delay indicating recognition and to store label and timing information for a predetermined time, and to replace said stored label and timing information with those for any said element subsequently recognized during said predetermined time having a confidence measure indicating a greater confidence in the correctness of assignment of the corresponding label than that of said stored label, and to output the stored label and timing information at the end of said predetermined time.

5. Apparatus according to claim 1, 2, 3 or 4 wherein said output means operates to indicate recognition if the label to be output has a corresponding confidence measure indicating a greater degree of confidence in its correctness of assignment than that of any of the labels corresponding to a predetermined number of succeeding portions in said array.

6. Apparatus according to claim 1, 2, 3 or 4 wherein:
said buffer means includes one or more shift registers,
said decision means tests the confidence measures of said labels in said buffer means at the input to each buffer means, and
said output means outputs labels and timing information if, before the label to be output has reached the output, no further confidence measure maxima greater than that to be output have been detected at the input of an output buffer means.

7. Apparatus according to claim 1, 2, 3 or 4 wherein said array contains only values for portions of data spanning a total time length less than the time duration of said element to be recognized.

8. Apparatus according to claim 1, 2, 3 or 4 wherein:
(a) said input means includes an input buffer shift register comprising a series of cells through which said signal can be continuously stepped, the contents of the buffer constituting a said temporal portion; and
(b) said decision means comprises means for reading the feature detection device at steps of said signal through said register and comparing the readings for said features with predetermined reference vectors each having a corresponding label, and assigning that label whose reference vector most closely matches said readings together with a corresponding confidence measure to the portion of said signal which produced said readings.

9. Apparatus according to claim 8 wherein said input buffer is dimensioned to contain a signal portion corresponding in time duration to at least the length of the longest element of speech to be recognized, and said labels are assigned at each step of said signal through said input buffer.

10. Apparatus according to claim 8 wherein said feature detection device further comprises means including a cumulative store for each detectable feature, the content of said stores indicating whether a feature has been detected since the store was last cleared and means for comparing the contents of the stores with said reference vectors at each step of said signal through said input buffer, said cumulative stores being cleared after a predetermined time.

11. Apparatus according to claim 10 wherein said cumulative stores are cleared after a label is output from said system.

12. Character string matching apparatus comprising apparatus according to claim 8 wherein said input buffer is connected to receive a binary coded character string, and each said cell stores a binary-coded character, and each said feature corresponds to at least one binary coded character.

13. Speech recognition apparatus comprising pattern recognition apparatus according to 3 or 4.

14. A method of detecting the occurrence of speech events in a speech signal comprising the steps of:
(a) partitioning the speech signal into successive, overlapping temporal portions $S_i$;
(b) comparing each portion $S_i$ with a vocabulary of speech events and generating, for each said speech event, a measure $C_i$ of the similarity between the portion $S_i$ and that speech event $L_n$;

(c) for each portion $S_i$, finding the highest-ranking speech event $L_1$, and at least the next-highest-ranking speech event $L_2$, ranked by their similarity to that portion in accordance with their similarity measures $C_1$, $C_2$;

(d) storing an indication of the highest-ranking such speech event $L_1$ and of the corresponding similarity measure $C_1$ for each of a sequence of successive portions $S_1, S_2 \ldots$, spanning a time interval at least comparable to the length of the longest speech event in the said vocabulary;

(e) locating the temporal position of the detected highest-ranking speech event $L_1$, within the sequence, by finding a local maximum portion $S_K$ indicated by its highest-ranking similarity measure $C_1$ to be more similar to the highest-ranking speech event $L_1$ than those preceding it and succeeding it in the sequence; and (f) indicating recognition of the highest-ranking speech event $L_1$ at the temporal position corresponding to the local maximum portion $S_K$.

15. A method according to claim 14 further comprising the steps of:

(g) storing also, for each portion of the said sequence $S_1, S_2 \ldots$, an indication of at least one of the next-highest ranking speech events and corresponding indication(s) of similarity measure;

(h) upon finding a said local maximum portion $S_K$, detecting whether successive portions including the said local maximum portion are becoming more similar to a lower-ranking speech event; and if so, (i) inhibiting indication of recognition.

16. A method according to claim 15 in which the said step of inhibiting indication of recognition comprises the step of:

(a) storing data corresponding to the indication which would otherwise have been made;

(b) determining whether, in a predetermined time following the said local maximum, there is a further local maximum portion, and, if so, (c) determining which of the stored local maximum portion $S_K$ and any further such local maximum portions was more similar to its corresponding speech event, and (d) indicating recognition of that corresponding speech event.

* * * * *